United States Patent [19]

Higuchi et al.

[11] 4,169,235
[45] Sep. 25, 1979

[54] ELECTRIC MOTOR WITH A BUILT-UP TYPE ROTOR USING TAPERED SECTIONS

[75] Inventors: Shigeo Higuchi; Tsutomu Iwasaki; Koji Sato; Akira Ishida; Norimasa Chiba, all of Ibaraki, Japan

[73] Assignee: Hitachi, Ltd., Japan

[21] Appl. No.: 880,952

[22] Filed: Feb. 24, 1978

[30] Foreign Application Priority Data

Mar. 10, 1977 [JP] Japan .................................. 52/26391
Apr. 13, 1977 [JP] Japan .................................. 52/41356

[51] Int. Cl.² .......................................... H02K 1/22
[52] U.S. Cl. .................................. 310/261; 310/263; 310/269
[58] Field of Search ............... 310/261, 263, 265, 269, 310/216–218, 42, 262

[56] References Cited
U.S. PATENT DOCUMENTS

| 2,736,829 | 2/1956 | Sills ................................. 310/269 X |
| 3,083,311 | 3/1963 | Krasnow .......................... 310/261 X |

FOREIGN PATENT DOCUMENTS

| 567854 | 8/1930 | Fed. Rep. of Germany .......... 310/261 |
| 591166 | 12/1933 | Fed. Rep. of Germany .......... 310/261 |
| 1332849 | 10/1973 | United Kingdom .................... 310/261 |

Primary Examiner—Mark O. Budd
Attorney, Agent, or Firm—Craig and Antonelli

[57] ABSTRACT

This invention concerns a rotary electric machine, for example, a synchronous machine having salient rotary magnetic poles, which is equipped with a built-up type rotor. The built-up type rotor consists of a plurality of rotary members, which are coupled in the axial direction into an integral form.

In such a built-up type rotor, the rotary members are sometimes displaced with respect to one another in the radial direction by centrifugal forces to which they are subjected during operation (rotation). As a result, the rotational balance of the rotor is lost, which tends to cause oscillations. Therefore, by skillfully exploiting the centrifugal forces which the rotary members undergo during operation (rotation), the radial displacements of the rotary members to one another are suppressed, thereby also serving to suppress the generation of oscillations.

21 Claims, 6 Drawing Figures

ELECTRIC MOTOR WITH A BUILT-UP TYPE ROTOR USING TAPERED SECTIONS

BACKGROUND OF THE INVENTION

This invention relates to a rotary electric machine, for example, a synchronous machine having salient rotary magnetic poles. More particularly, it relates to a rotary electric machine equipped with a so-called built-up type rotor in which a plurality of rotary members are coupled in the axial direction into an integral form.

In general, the built-up type rotor is split in a plurality of rotary members in order to avoid inconveniences in the fabrication and in the transportation of the rotor as are attendant upon a large-sized structure. To this end, the rotary members are respectively and individually fabricated, and the individual members are transported in separate forms. At the installation site, the respective rotary members are then coupled in the axial direction so as to build up the rotor. For further discussion of this subject, refer to U.S. Pat. No. 3,780,428 and "The Brown Boveri Review", Vol. 52, No. ½, page 34, FIG. 46.

The coupling faces of the rotary members of such a split rotor are formed into surfaces at right angles to the axial direction, and the rotary members are integrally coupled by means of clamping bolts. In addition, in order to facilitate assembling the rotary members coaxially with one another and to prevent the rotary members from being displaced in the radial direction from one another, the respective rotary members are provided on radially inner sides thereof with faucet joints for snugly fitting the adjacent rotary members to each other.

On the outer periphery of the split rotor thus constructed, magnetic poles (consisting of a field core and a field winding) are mounted to form rotary magnetic poles in the case of, for example, a synchronous machine, and a field winding is assembled by providing a winding groove in the case of, for example, a turbo-generator.

In the case where such a built-up type rotor is comparatively small-sized and is rotated at low speed, it carries out a stable rotation without undergoing radially outward displacements among the rotary members. However, in the case where the machine size becomes large with increase in the capacity of the rotary electric machine and the speed becomes high, the radially outward displacements of the rotary members cannot be suppressed by only the frictional forces of the coupling faces and the faucet joints between the adjacent rotary members as described above. The rotational balance of the split rotor therefore collapses due to the radially outward displacements of the rotary members, so that oscillations occur. The oscillations cause the built-up type rotor, and in turn, the whole rotary electric machine, to be subject to damage.

More specifically, when the split rotor is large-sized, naturally the respective rotary members are large-sized. When the rotor rotates at high speed, the respective rotary members are stretched by centrifugal forces. If the degree of stretching is equal for all the rotary members, the symmetry of the rotor will not be impaired and the rotational balance will not be affected. Due to differences in the frictional force between the adjoining rotary members and in the shapes of the respective rotary members, however, the degree of stretching of the individual rotary members is generally not equal, so that the rotary members are displaced by different amounts. If the stretching directions of each rotary member are basically the same over the entire circumference thereof, the rotational balance will not be seriously affected even when the adjacent rotary members are subject to slight differences in displacement. In practice, however, the stretching directions are not uniform over the entire circumference, but appear in irregular directions on account of the aforecited differences in the frictional forces and in the shapes of the respective rotary members. The non-uniform displacements break the rotational balance, and form the basic cause of the oscillations which result in ultimate damage to the machine.

SUMMARY OF THE INVENTION

An object of this invention is to provide a rotary electric machine equipped with a split rotor in which the stretching of rotary members in irregular directions is reduced.

Another object of this invention is to provide a rotary electric machine equipped with a built-up type rotor in which the frictional force between the respectively adjacent rotary members during rotation is increased.

In order to accomplish these objects, according to this invention, at least one of the coupling faces between first and second rotary members and a third rotary member consisting of at least one member coupled in the axial direction between the first rotary member and the second rotary member is formed with a tapered surface by which the spacing between the first and second rotary members is made short at a radially outer position and long at a radially inner position, and the contact surface pressure between the respective rotary members is increased by exploiting the force of the third rotary member intending to stretch during rotation, thereby intending to increase the frictional force between the respective rotary members and to suppress the stretching of the rotary members in irregular directions.

DESCRIPTION OF THE PREFERRED EMBODIMENTS

Figure 1:
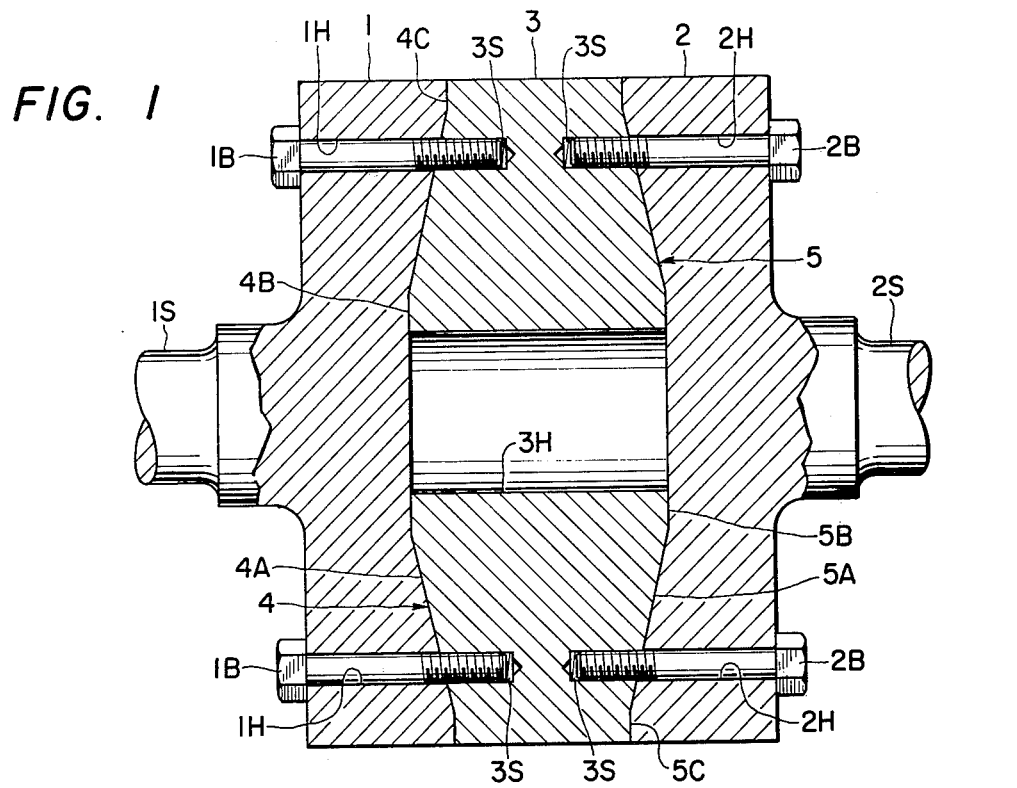
FIG. 1 is a vertical sectional side elevation showing an embodiment of the split rotor according to this invention.

FIG. 1 shows a built-up type rotor. When broadly viewed, it is constructed of a first rotary member 1 and a second rotary member 2 which are respectively shaped into discs, a third rotary member 3 which is shaped into a disc and which is interposed between the first and second rotary members, and bolts 1B and 2B which serve to couple these rotary members. The first rotary member 1 and the second rotary member 2 are formed integrally with rotary shafts 1S and 2S, respectively.

In the case where a rotary electric machine equipped with the built-up type rotor operates as a driven machine, the driving machine, such as a gas turbine, a steam turbine or a Diesel engine, is connected to the rotary shafts 1S and 2S. In the case where the rotary electric machine equipped with the split rotor operates as a driving machine, a driven machine, such as the runner of a pump or the winding drum of a hoist, is connected to the rotary shafts 1S and 2S.

The first rotary member 1 and the second rotary member 2 are respectively provided with bolt holes 1H and 2H which extend in the axial direction and which lie on an identical circumference coaxial with the rotary shafts 1S and 2S. On the other hand, the third rotary member 3 is formed at its central part with a hollow 3H in order to lighten the weight thereof. Further, threaded bolt holes 3S for the bolts are axially provided in those positions of the third rotary member 3 which oppose the bolt holes 1H and 2H. The bolts 1B and 2B are respectively inserted from the end faces of the first and second rotary members 1 and 2 into the bolt holes 1H and 2H, and threadably engaged into the female holes 3S of the third rotary member 3. Thus, the rotary members 1, 2, and 3 are made integral to build up the rotor.

The construction explained thus far is the same as in a prior art built-up type rotor. The three rotary members 1, 2, and 3 are produced in parallel during fabrication, they are then assembled into an integral form and the assembly is subjected to a rotating test within the factory. Further, the rotor is disassembled into the three parts and then transported to the point of use, and the parts are assembled again at the installation site.

In addition to the above-described prior art construction, according to this invention the coupling faces of the respective rotary members 1, 2, and 3 of the built-up type rotor are modified. That is, that coupling face 4 between the first rotary member 1 and the third rotary member 3 and the coupling face 5 between the second rotary member 2 and the third rotary member 3 are respectively formed with tapered surfaces 4A and 5A. The tapered surfaces 4A and 5A are characterized in that the axial spacing between the first rotary member 1 and the second rotary member 2 is longer on the radially inner side of the assembly and shorter on a radially outer side thereof.

By forming such tapered coupling faces 4 and 5, even when the third rotary member 3 has a tendency to shift radially outwards due to centrifugal forces during rotation, the radially outward displacement is suppressed owing to the realignment of the forces at the surfaces of the first and second rotary members due to the tapered surfaces 4A and 5A, respectively. Therefore, the centrifugal force acting on the third rotary member 3 generates component forces which attempt to expand the first and second rotary members 1 and 2 in the axial direction as a result of the angular disposition of the respective tapered surfaces 4A and 5A. As the result, the contact surface pressures of the coupling faces 4 and 5 increase. Accordingly, when compared with the prior art construction in which the frictional forces relay on the mere clamping forces of the bolts, the frictional forces of the coupling faces in accordance with this invention are enhanced, and hence, the built-up type rotor according to this invention becomes a truly rigid integral structure.

Owing to the suppression of the radially outward displacement of the rotary member 3 and the intensified frictional forces provided by the tapered surfaces 4A and 5A, the shifting between the respectively adjacent rotary members is suppressed, with the result that the movements of the rotary members 1, 2, and 3 do not appear in irregular directions. Accordingly, the collapse of the rotational balance of the built-up type rotor as attributed to such irregular displacements is avoided, and the generation of undesirable oscillations can be suppressed.

Figure 2:
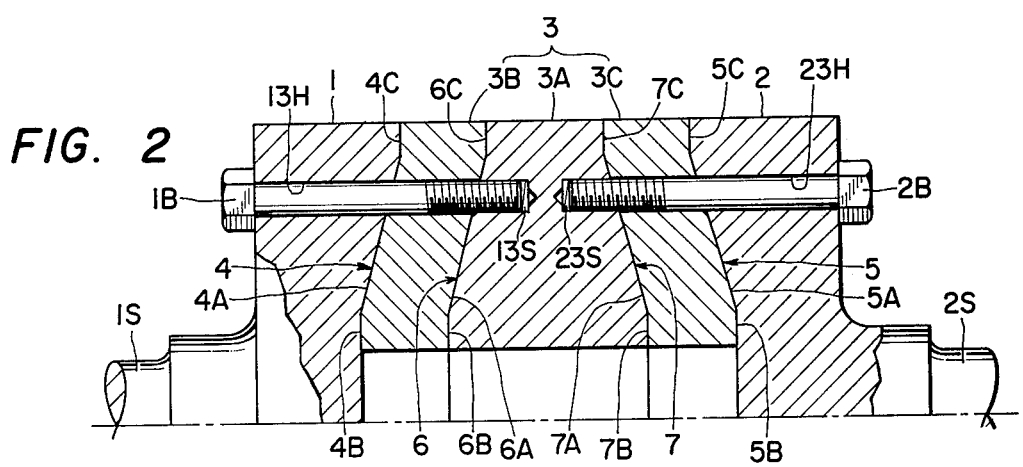
FIG. 2 through 6 are vertical sectional side elevations each showing the upper half of another embodiment of the built-up type rotor according to this invention.

The split rotor described above is the so-called three-segment type rotor which consists of three rotary members. In a rotary electric machine of still larger size, it is desirable that the rotor is split into four or more parts so as to facilitate fabrication and transportation thereof. FIG. 2 shows a split rotor which consists of five rotary members. In this case, a first rotary member 1 and a second rotary member 2 have the same shapes as in the built-up type rotor illustrated in FIG. 1, and they are formed integrally with rotary shafts 1S and 2S, respectively. A third rotary member 3 is coupled between the first and second rotary members 1 and 2. The coupling face 4 between the first rotary member 1 and the third rotary member 3 and the coupling face 5 between the second rotary member 2 and the third rotary member 3 are respectively formed with tapered surfaces 4A and 5A. As also provided in the embodiment of FIG. 1, the tapered surfaces 4A and 5A incline so that the axial spacing between the first and second rotary members 1 and 2 is greater on the radially inner side of the assembly and smaller on the radially outer side thereof.

However, in contrast to the built-up type rotor of FIG. 1, in this embodiment the third rotary member 3 is divided into three parts composed of the members 3A, 3B, and 3C. The coupling faces 6 and 7 between the adjacent ones of the three members 3A, 3B, and 3C are respectively formed with tapered surfaces 5A and 7A which incline similarly to the tapered surfaces 4A and 5A so that the axial spacing between the members 3B and 3C is greater on the radially inner side of the assembly and smaller on the radially outer side thereof.

To be scrupulously considered here is the fact that the axial thicknesses of the members 3B and 3C which are respectively held between the two tapered surfaces 4A and 6A and the two tapered surfaces 5A and 7A, must not be greater on the radially outer side of the assembly and smaller on the radially inner side thereof. More specifically, when the radially outer side is thicker in the axial direction than the radially inner side, the thick, radially outer sides of the members 3B and 3C tend to direct displacements towards the rotary members 1 and 2 respectively, and hence, the frictional forces of the radially outer sides between the members 3B and 3A and between the members 3C and 3A are reduced. It is accordingly desirable to make the axial thicknesses of the members 3B and 3C equal on the radially inner and outer sides, or to make the axial thickness on the radially outer side smaller than that on the radially inner side. This requirement, however, is not absolute. Insofar as the tapered surfaces 4A, 5A, 6A, and 7A incline substantially in the same direction, the frictional forces become intenser than in the prior art split rotor (the coupling faces are orthogonal to the axial direction), so that displacement of the rotary members in irregular directions can be suppressed to reduce undesirable oscillations.

Among the five members which form the basic rotor elements in the embodiment of FIG. 2, the members 1 and 3B and the members 2 and 3C are respectively provided with bolt holes 13H and 23H which penetrate through both the members in the axial direction and which lie on an identical circumference. Threaded bolt holes 13S and 23S for the bolts are respectively provided in those positions of the member 3A which oppose the bolt holes 13H and 23H. Bolts 1B and 2B are inserted into the bolt holes 13H and 23H and are threadably engaged with the threaded holes 13S and 23S.

During the rotation of such a five-element built-up type rotor, the member 3A tends to shift radially outwards in response to an applied centrifugal force. However, such shifting is suppressed by the tapered surfaces 6A and 7A. Instead, component forces tending to widen the axial spacing between the members 3B and 3C act on the adjacent surfaces. Thus, the frictional forces of the coupling faces 6 and 7 increase. On the other hand, the members 3B and 3C exert component forces tending to widen the axial spacing between the members 1 and 2, owing to forces tending to direct the elements radially outwards in response to the applied centrifugal forces and the component forces of the member 3A. Thus, the frictional forces of the coupling faces 4 and 5 increase.

Consequently, owing to the increased frictional forces between the respectively adjacent members, the five-element built-up type rotor becomes a secure integral structure, and the displacement of each member in irregular directions is avoided.

In FIGS. 1 and 2, the tapered surfaces 4A, 5A, 6A, and 7A are formed at parts of the respective coupling faces 4, 5, 6, and 7. On radially inner sides and radially outer sides of the respective tapered surfaces, there are provided on each member radially inner surfaces 4B, 5B, 6B, and 7B and radially outer surfaces 4C, 5C, 6C, and 7C which are at right angles to the axial direction. The radially inner and outer surfaces can be employed as reference surfaces for facilitating the working of the tapered surfaces. More specifically, in the case of working the tapered surfaces aslant from the outermost parts to the innermost parts of the coupling faces, 4, 5, 6, and 7, it is difficult because of the relation between the axial thicknesses of the respective members to ensure that the positions of the beginning of the working and the end thereof are caused to agree.

In this respect, when the radially inner and outer surfaces orthogonal to the axial direction are formed, the axial thicknesses of the radially inner and outer sides of the respective members can be easily prescribed. When the radial widths of the radially inner and outer surfaces are additionally prescribed and the working is executed so as to join the end of the radial width of the radially inner surface and the end of the radial width of the radially outer surface, the tapered surface can be readily obtained. However, the radially inner and outer surfaces need not be always provided in the fabrication of the built-up type rotor. Even when the coupling faces 4 and 5 are wholly tapered surfaces, as illustrated in FIG. 3, the same advantages obtained in the split rotors shown in FIGS. 1 and 2 apply with respect to the suppression of the displacement of the respective members and the increase of frictional forces in the built-up type rotor.

Figure 3:
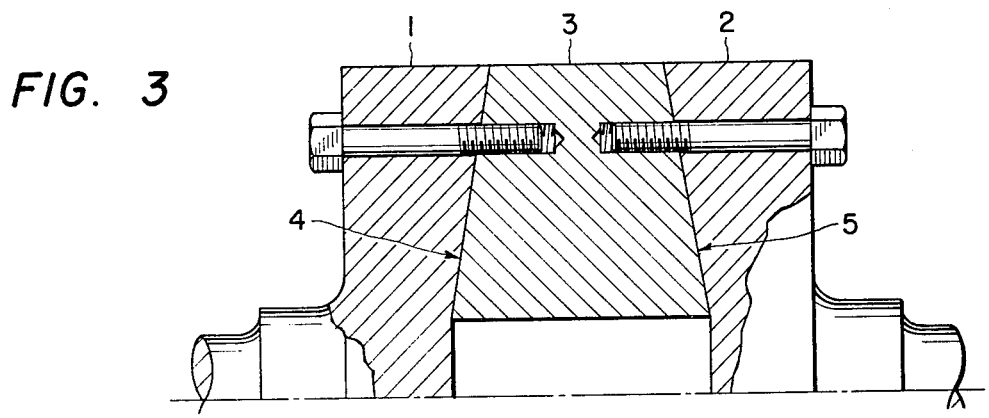

Regarding the built-up type rotors of FIGS. 1 to 3, as explained above, measures are taken especially against the radially outward shifting of the members due to the centrifugal forces during the rotation, and no steps are taken to prevent, for example, radially inward displacement of the respective members. The radially inward displacements do not frequently occur, and do not develop in all sorts of rotary electric machines, either. Even when the radially inward displacements arise, they are slight, and oscillations attendant upon the displacements are trifling, so that the operation of the machine is not hindered. It is still more desirable, however, that both the radially inward and outward displacements are suppressed to reduce the occurrence of the oscillations to the utmost. Therefore, a split rotor is constructed, as illustrated in FIG. 4, whereby displacements of the respective members in both the radially inward and outward directions are suppressed.

Figure 4:
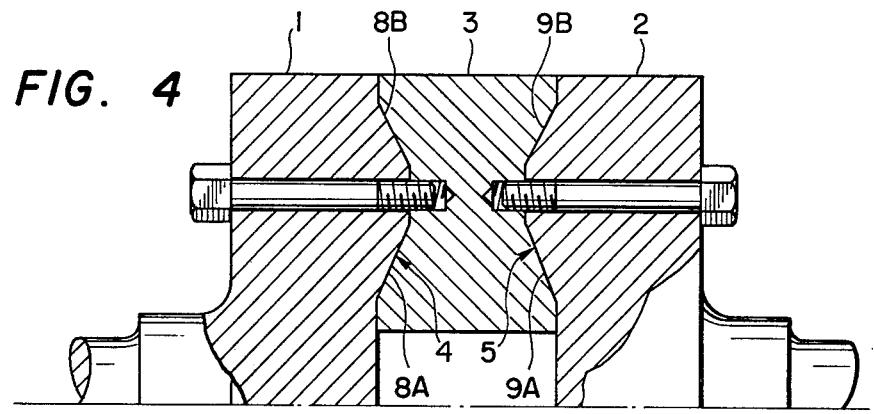

Referring to FIG. 4, the coupling face 4 between a first rotary member 1 and a third rotary member 3 and the coupling face 5 between a second rotary member 2 and the third rotary member 3 are respectively formed with two tapered surfaces 8A, 8B and 9A, 9B. The tapered surfaces 8A and 8B (9A and 9B) are inclined in directions opposite to each other in the coupling face 4 (5).

In such a split rotor, the shifting of the third rotary member 3 in the radially outward direction is suppressed by the tapered surfaces 8A and 9A which are formed so that the axial spacing between the first rotary member 1 and the second rotary member 2 may become narrower on the radially outer side. On the other hand, the shifting of the third rotary member 3 in the radially inward direction is also suppressed by the tapered surfaces 8B and 9B, which are formed so that the axial spacing between the rotary members 1 and 2 may become wider on the radially outer side. Therefore, both the radially inward and outward displacements are suppressed.

As stated earlier, most rotary electric machines are more susceptible to the radially outward displacements than to the radially inward displacements. It is therefore desirable that, as shown in FIG. 5, the taper surfaces 8B and 9B are respectively provided in the vicinities of the outermost parts of the coupling faces 4 and 5, while the remaining greater parts are alloted to and formed into the tapered surfaces 8A and 9A.

Figure 5:
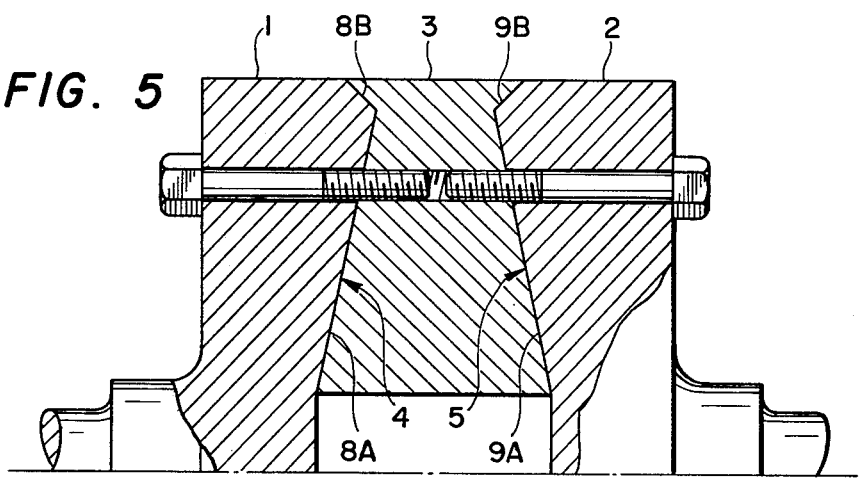

In FIGS. 4 and 5, the tapered surfaces 8A, 8B and 9A, 9B of the two coupling faces 4 and 5 are formed bilaterally symmetrically. However, insofar as at least two tapered surfaces of different inclining directions exist in one coupling face, the bilateral symmetry is not necessary.

Figure 6:
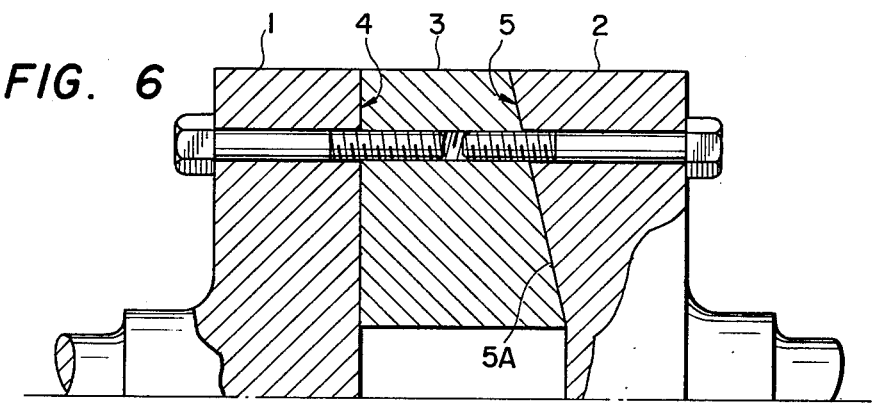

In any of the built-up type rotors of FIGS. 1 to 5, as thus far explained, the coupling face 4 between the first rotary member 1 and the third rotary member 3 and the coupling face 5 between the second rotary member 2 and the third rotary member 3 are respectively formed with tapered surfaces. However, in the sense of making the frictional forces intenser and the displacement in the irregular directions less than in the prior art built-up type rotor, it is unnecessary to taper the surfaces of both the two coupling faces 4 and 5. For example, a tapered surface 5A may be provided for only the coupling face 5 on one side of the member 3, as shown in FIG. 6. As in FIGS. 1 to 5, however, the inclination of the tapered surface 5A at that time needs to be formed for the radially outward displacement so that the axial spacing between the first rotary member 1 and the second rotary member 2 may become wider on the radially inner side and narrower on the radially outer side. With such a construction, although the third rotary member 3 tends to shift radially outwards due to the applied centrifugal force during the operation of the machine, the displacements in the radially outward directions are suppressed because the axial spacing between the rotary members 1 and 2 is narrow on the radially outer side. Instead, a component force tending to expand the axial spacing between the rotary members 1 and 2 acts on the tapered surface 5A and increases the frictional force of the tapered surface 5A. On the other hand, the coupling face 4 is subject to the reaction force of the component force acting on the tapered surface 5A, though it is not so strong as the component force. Therefore, the frictional force of the coupling face 4 is somewhat increased, and this can contribute to suppression of the shifting of the third rotary member 3 in the irregular directions.

It should also be apparent that the tapered surface 5A in the embodiment of FIG. 6 may have a configuration similar to that of the face 5 in the embodiments of FIGS. 4 and 5. In this way, displacements in both the inward and outward radial directions can be suppressed, as explained above.

As set forth above, according to this invention, by exploiting forces tending to shift the respective rotary members in the radial direction during rotation, the frictional forces of the coupling faces between the adjacent rotary members are increased, whereby the respective rotary members can be securely maintained in an integral form. Thus, the displacement of the rotary members in irregular directions can be diminished, with the result that a rotary electric machine equipped with a built-up type rotor of little oscillations and of stable strength can be provided.

While we have shown and described several embodiments in accordance with the present invention, it is understood that the same is not limited thereto but is susceptible of numerous changes and modifications as known to those of ordinary skill in the art, and we therefore do not wish to be limited to the details shown and described herein but intend to cover all such changes and modifications as are obvious to those skilled in the art.

What is claimed is:

1. For use in a rotary electric machine, a built-up type rotor comprising first and second rotary members, a third rotary member which includes at least one rotating element interposed in an axial direction between the first and second rotary members, and coupling means for coupling these rotary members in a manner to be freely disassembled and re-coupled, the coupling faces between at least one pair of the respectively adjacent rotary members being formed at least partially with a tapered surface, said tapered surface being inclined to the radial direction so that the axial spacing between said first and second rotary members is narrower on a radially outer side of the rotor and wider on the radially inner side thereof.

2. A built-up rotor for a rotary electric machine as defined in claim 1, characterized in that a radially directed inner surface and a radially directed outer surface at right angles to the axial direction are formed on the radially inner side and the radially outer side, respectively, of said coupling face having said tapered surface, and that said tapered surface is formed between said radially directed inner surface and said radially directed outer surface.

3. A built-up rotor for a rotary electric machine as defined in claim 1, characterized in that said third rotary member is constructed of a plurality of adjacent rotary elements.

4. A built-up rotor for a rotary electric machine as defined in claim 1, characterized in that said coupling face is formed with first and second tapered surfaces, and that said first tapered surface is inclined so that the axial spacing between said first and second rotary members are narrower on the radially outer side of that tapered portion and wider on the radially inner side thereof, while said second tapered surface is inclined so that the axial spacing between said first and second rotary members are wider on the radially outer side of that tapered portion and narrower on the radially inner side thereof.

5. A built-up rotor for a rotary electric machine as defined in claim 4, characterized in that the breadth of said first tapered surface in the radial direction is greater than the breadth of said second tapered surface in the radial direction.

6. A built-up rotor for a rotary electric machine as defined in claim 1, characterized in that a radially directed inner surface and a radially directed outer surface at right angles to the axial direction are respectively formed on the radially inner side and the radially outer side of said coupling face having said tapered surface, that first and second tapered surfaces are formed between said radially inner and outer surfaces, and that said first tapered surface is inclined so that the axial spacing between said first and second rotary members are narrower on the radially outer side of that tapered portion and wider on the radially inner side thereof, while said second tapered surface is inclined so that the axial spacing between said first and second rotary members is wider on the radially outer side of that tapered portion and narrower on the radially inner side thereof.

7. A built-up rotor for a rotary electric machine as defined in claim 6, characterized in that the breadth of said first tapered surface in the radial direction is greater than the breadth of said second tapered surface in the radial direction.

8. A built-up type rotor for a rotary electric machine comprising first and second rotary members, a third rotary member which includes at least one rotary element interposed in an axial direction between the first and second rotary members, and coupling means to couple these rotary members in a manner to be freely disassembled and recoupled, each of the coupling faces between the first and third rotary members and the coupling face between the second and third rotary members is formed at least partially with a tapered surface, the tapered surfaces being respectively inclined so that the axial spacing between said first and second rotary members is narrower on the radially outer side of the rotor and wider on the radially inner side thereof.

9. A built-up rotor for a rotary electric machine as defined in claim 8, characterized in that radially directed inner surfaces and radially directed outer surfaces at right angles to the axial direction are respectively formed on the radially inner sides and the radially outer sides of said coupling faces, and that said tapered surfaces are formed between said radially inner surfaces and said radially outer surfaces.

10. A built-up rotor for a rotary electric machine as defined in claim 8, characterized in that said third rotary member is constructed of a plurality of rotary elements.

11. A built-up rotor for a rotary electric machine as defined in claim 8, characterized in that said coupling faces are respectively formed with first and second tapered surfaces, and that each of said first tapered surfaces is inclined so that the axial spacing between said first and second rotary members is narrower on the radially outer side of that tapered portion and wider on the radially inner side thereof, while each of said second tapered surfaces is inclined so that the axial spacing between said first and second rotary members is wider on the radially outer side of that tapered portion and narrower on the radially inner side thereof.

12. A built-up rotor for a rotary electric machine as defined in claim 11, characterized in that the breadth of each of said first tapered surfaces in the radial direction is greater than the breadth of each of said second tapered surfaces in the radial direction.

13. A built-up rotor for a rotary electric machine as defined in claim 8, characterized in that radially inner surfaces and radially outer surfaces at right angles to the axial direction are respectively formed on the radially inner sides and the radially outer sides of said coupling faces, that the first and second tapered surfaces are formed between said radially inner surfaces and said radially outer surfaces, and that each of said first tapered surfaces is inclined so that the axial spacing between said first and second rotary members is narrower on the radially outer side of that tapered portion and wider on the radially inner side thereof, while each of said second tapered surfaces is inclined so that the axial spacing between said first and second rotary members is wider on the radially outer side of that tapered portion and narrower on the radially inner side thereof.

14. A built-up rotor for a rotary electric machine as defined in claim 13, characterized in that the breadth of each of said first tapered surfaces in the radial direction is greater than the breadth of each of said second tapered surfaces in the radial direction.

15. A built-up rotor for a rotary electric machine, comprising first and second rotary members which are formed integrally with rotary shafts, a third rotary member which has a hollow and which is interposed in an axial direction between said first and second rotary members and said second and third rotary members in a manner to be freely disassembled and re-coupled, radially inner surfaces and radially outer surfaces which are respectively provided on radially inner sides and radially outer sides of the coupling faces between the respectively adjacent rotary members and which are at right angles to the axial direction, and tapered surfaces which are respectively formed between said radially inner surfaces and said radially outer surfaces of said coupling faces and are disposed so that the axial spacing between said first and second rotary members is narrower on the radially outer side of the rotor and wider on the radially inner side thereof.

16. A built-up rotor for a rotary electric machine, comprising first and second rotary members which are formed integrally with rotary shafts; a third rotary member which has a hollow and which is interposed in an axial direction between said first and second rotary members, including three rotary elements which are juxtaposed in the axial direction and which constitute said third rotary member; bolts which couple said first rotary member and among said three members, the member situated at an end on the side of said first rotary member as well as the member situated in the middle, and said second rotary member and among said three members, the member situated at an end on the side of said second rotary member as well as the member situated in the middle, respectively, in a manner to be freely disassembled and re-coupled; radially inner surfaces and radially outer surfaces which are respectively provided on radially inner sides and radially outer sides of the coupling faces of the respective rotary members and which are at right angles to the axial direction; tapered surfaces which are respectively formed between said radially inner surfaces and said radially outer surfaces of said coupling faces so that the axial spacing between said first and second rotary members is narrower on the radially outer side of said rotor and wider on the radially inner side thereof; radially inner surfaces and radially outer surfaces which are respectively provided on radially inner sides and radially outer sides of the coupling faces of the respective rotary elements constituting said third rotary member and which are at right angles to the axial direction, and tapered surfaces which are respectively formed between said radially inner surfaces and said radially outer surfaces of said coupling surfaces so that the axial spacing between the members situated at both ends is narrower on the radially outer side of said rotor and wider on the radially inner side thereof.

17. A built-up rotor for a rotary electric machine, comprising first and second rotary members which are formed integrally with rotary shafts; a third rotary member which has a hollow and which is interposed in an axial direction between said first and second rotary members; bolts which couple said first rotary member as well as said third rotary member and said second rotary member as well as said third rotary member, respectively, in a manner to be freely disassembled and re-coupled; and tapered surfaces which are respectively formed on coupling surfaces between the respectively adjacent rotary members so that the axial spacing between said first and second rotary members is narrower on a radially outer side of said rotor and wider on a radially inner side thereof.

18. A built-up rotor for a rotary electric machine, comprising first and second rotary members which are formed integrally with rotary shafts; a third rotary member which has a hollow and which is interposed in an axial direction between said first and second rotary members; bolts which couple said first rotary member as well as said third rotary member and said second rotary member as well as said third rotary member, respectively, in a manner to be freely disassembled and re-coupled; radially inner surfaces and radially outer surfaces which are respectively provided on radially inner sides and radially outer sides of the coupling faces between the respectively adjacent rotary members and which are at right angles to the axial direction; first tapered surfaces which are respectively formed between said radially inner surfaces and said radially outer surfaces of said coupling faces so that the axial spacing between said first and second rotary members is narrower on the radially outer side of that tapered portion and wider on the radially inner side thereof; and second tapered surfaces which are formed so that the axial spacing between said first and second rotary members is wider on the radially outer side of that tapered portion and narrower on the radially inner side thereof.

19. A built-up rotor for a rotary electric machine, comprising first and second rotary members which are formed integrally with rotary shafts; a third rotary member which has a hollow and which is interposed in an axial direction between said first and second rotary members; bolts which couple said first rotary member as well as said third rotary member and said second rotary member as well as said third rotary member, respectively, in a manner to be freely disassembled and re-coupled; first tapered surfaces which are respectively formed on coupling surfaces between the respectively adjacent rotary members so that an axial spacing between said first and second rotary members is narrower on a radially outer side of that tapered portion and wider on a radially inner side thereof; and second tapered surfaces which are respectively formed so that the axial spacing between said first and second rotary members is wider on the radially outer side of that tapered portion and narrower on the radially inner side thereof.

20. A built-up rotor for a rotary electric machine as defined in claim 19, wherein the breadth of said first tapered surface in a radial direction is made greater than the breadth of said second tapered surface in the radial direction.

21. A built-up rotor for a rotary electric machine, comprising first and second rotary members which are formed integrally with rotary shafts; a third rotary member which has a hollow and which is interposed in an axial direction between said first and second rotary members; bolts which couple said first rotary member as well as said third rotary member and said second rotary member as well as said third member in a manner to be freely disassembled and re-coupled, respectively; the coupling face between said first and third rotary member being formed at right angles to the axial direction, and the coupling face between said second and third rotary members being formed so that the axial spacing between said first and second rotary members is wider on the radially inner side of the rotor and narrower on the radially outer side thereof.

* * * * *